(12) United States Patent
Sasaki et al.

(10) Patent No.: US 10,207,602 B2
(45) Date of Patent: Feb. 19, 2019

(54) RECLINING DEVICE AND VEHICLE SEAT

(71) Applicant: NHK SPRING CO., LTD., Yokohama-shi (JP)

(72) Inventors: Yoshitaka Sasaki, Yokohama (JP); Yusuke Ohkawara, Yokohama (JP); Takeshi Chokyu, Yokohama (JP); Hiroaki Inaba, Yokohama (JP); Shunitirou Osa, Yokohama (JP); Tetuki Takano, Yokohama (JP); Eiki Mita, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 140 days.

(21) Appl. No.: 14/833,384

(22) Filed: Aug. 24, 2015

(65) Prior Publication Data
US 2016/0059742 A1 Mar. 3, 2016

(30) Foreign Application Priority Data
Aug. 28, 2014 (JP) .................................. 2014-173925

(51) Int. Cl.
*B60N 2/22* (2006.01)
*B60N 2/68* (2006.01)
*B60N 2/42* (2006.01)

(52) U.S. Cl.
CPC ............. *B60N 2/22* (2013.01); *B60N 2/4249* (2013.01); *B60N 2/682* (2013.01)

(58) Field of Classification Search
CPC ......... B60N 2/22; B60N 2/4249; B60N 2/682
USPC ......................................... 297/378.1, 452.18
See application file for complete search history.

(56) References Cited

U.S. PATENT DOCUMENTS

| 7,314,250 B1* | 1/2008 | Eblenkamp .......... B60N 2/0232 297/362 |
| 9,022,479 B2* | 5/2015 | Hellrung ................. B60N 2/22 297/378.13 |
| 2012/0306253 A1* | 12/2012 | Seibold .................... B60N 2/68 297/452.18 X |

FOREIGN PATENT DOCUMENTS

| JP | 2005-186646 A | 7/2005 |
| JP | 2007-75424 A | 3/2007 |
| JP | 2007-130307 A | 5/2007 |

OTHER PUBLICATIONS

Japanese Office Action dated Jan. 30, 2018 in 5 pages.

* cited by examiner

*Primary Examiner* — Anthony D Barfield
(74) *Attorney, Agent, or Firm* — Knobbe, Martens, Olson & Bear, LLP (57) ABSTRACT

A reclining device including: a lower frame member that configures a portion of a frame of a vehicle seat; an upper frame member that configures a portion of the frame of the vehicle seat; a recliner that is provided between and welded to both the lower frame member and the upper frame member, and that couples the upper frame member to the lower frame member such that a relative rotation angle of the upper frame member is adjustable relative to the lower frame member; a lower side engagement portion that is provided at the lower frame member and that is formed in a circular arc shape that is concentric with the recliner; and an extension member that extends from the upper frame member toward a lower frame member side.

5 Claims, 12 Drawing Sheets

RECLINING DEVICE AND VEHICLE SEAT

CROSS-REFERENCE TO RELATED APPLICATION

This application is based on and claims priority under 35 USC 119 from Japanese Patent Application No. 2014-173925 filed on Aug. 28, 2014, the disclosure of which is incorporated by reference herein.

BACKGROUND

Technical Field

The present invention relates to a reclining device coupling a seatback to a seat cushion such that the seatback can adjust an angle relative to the seat cushion, and a vehicle seat including the reclining mechanism.

Related Art

In a reclining device described in Japanese Patent Application Laid-Open (JP-A) No. 2007-130307, a reclining unit (recliner) is provided between a lower arm (lower frame member) at a seat cushion side, and an upper arm (upper frame member) at a seatback side. The recliner is fixed by welding to the lower frame member and the upper frame member.

In reclining devices such as that described above, an excessive load acts on the lower frame member at the seat cushion side from the upper frame member at the seatback side, through the recliner during a collision of the vehicle or the like. When this occurs, force in a detachment direction is applied to weld portions between the recliner and the upper frame member, and between the recliner and the lower frame member, therefore the strength of the weld portions needs to be secured. However, there is also a demand for weight reduction in vehicle seats, and the recliner needs to be smaller in diameter (smaller in size) and the respective frame members need to be thinner, which is counterproductive to securing the strength of the weld portions.

SUMMARY

In consideration of the above circumstances, an object of the present invention is to obtain a reclining device and a vehicle seat capable of reducing force in a detachment direction applied to a weld portion between a recliner and a frame member during input of load to the vehicle seat during a vehicle collision or the like.

A reclining device according to a first aspect of the present invention, including: a lower frame member that configures a portion of a frame of a vehicle seat; an upper frame member that configures a portion of the frame of the vehicle seat; a recliner that is provided between and welded to both the lower frame member and the upper frame member, and that couples the upper frame member to the lower frame member such that a relative rotation angle of the upper frame member is adjustable relative to the lower frame member; a lower side engagement portion that is provided at the lower frame member and that is formed in a circular arc shape that is concentric with the recliner; and an extension member that extends from the upper frame member toward a lower frame member side, and that includes an upper side engagement portion facing the lower side engagement portion from an opposite side from the upper frame member so as to be capable of engaging with the lower side engagement portion.

In the reclining device described in the first aspect of the present invention, the lower frame member configuring a portion of the frame of the vehicle seat, and the upper frame member configuring a portion of the frame of the vehicle seat, are coupled together by the recliner welded to both members such that the relative rotation angle is adjustable. The lower frame member is provided with the lower side engagement portion formed in a circular arc shape concentric with the recliner. In addition, the extension member extending from the upper frame member toward the lower frame member side is provided with the upper side engagement portion that faces the lower side engagement portion from an opposite side from the upper frame member, so as to be capable of engaging with the lower side engagement portion. Thus, when load is input to the vehicle seat during a vehicle collision or the like, the upper side engagement portion engages with the lower side engagement portion from an opposite side from the upper frame member, such that the upper frame member and the lower frame member are suppressed from separating from each other. This enables force in a detachment direction, applied to weld portions between each frame member and the recliner, to be reduced.

The reclining device according to a second aspect of the present invention, wherein: plural first fitting portions, in a row about a peripheral direction of the recliner, are formed at the lower frame member; and plural second fitting portions, in a row about the peripheral direction of the recliner, are formed to the upper frame member, wherein the recliner includes: plural first projections welded to the lower frame member in a state fitted together with the plural first fitting portions; and plural second projections welded to the upper frame member in a state fitted together with the plural second fitting portions.

In the reclining device described in the second aspect of the present invention, the plural first projections provided to the recliner are welded to the lower frame member in the state fitted together with the plural first fitting portions formed to the lower frame member. In addition, the plural second projections provided to the recliner are welded to the upper frame member in the state fitted together with the plural second fitting portions formed to the upper frame member. It is difficult to secure strength of each of the above weld portions in such a configuration, due to the recliner having a smaller diameter and each of the frame members being thinner; however in the present invention, the engagement between the lower side engagement portion and the upper side engagement portion as described above enables the force in the detachment direction applied to each weld portion to be reduced. This enables the strength of each weld portion to be secured, while achieving, for example, the smaller diameter recliner and the thinner frame members.

The reclining device according to a third aspect of the present invention, wherein the upper side engagement portion faces the lower side engagement portion so as to be capable of engaging with the lower side engagement portion across an entire relative rotation range of the upper frame member relative to the lower frame member.

The reclining device described in the third aspect of the present invention is formed as described above, thereby enabling the advantageous effect described above to be obtained, regardless of the relative rotation range of the upper frame member relative to the lower frame member.

The reclining device according to a fourth aspect of the present invention, wherein the upper side engagement portion includes: a first facing portion that faces the lower side engagement portion from the opposite side from the upper frame member; and a second facing portion that faces the lower side engagement portion from a radial direction inside of the recliner.

In the reclining device described in the fourth aspect of the present invention, the upper side engagement portion, provided with the extension member extending from the upper frame member toward the lower frame member side, includes the first facing portion facing the lower side engagement portion of the lower frame member from an opposite side from the upper frame member, and the second facing portion facing the lower side engagement portion from the radial direction inside of the recliner. Thus, when load is input to the vehicle seat during a vehicle collision or the like, the first facing portion and the second facing portion engage with the lower side engagement portion from an opposite side from the upper frame member, and from the radial direction inside of the recliner, thereby enabling the upper frame member and the lower frame member to be effectively suppressed from separating from each other.

The reclining device according to a fifth aspect of the present invention, wherein the second facing portion is formed in a circular arc shape that is concentric with the recliner. In the reclining device described in the fifth aspect of the present invention, both the second facing portion of the upper side engagement portion, facing the lower side engagement portion of the lower frame member from the radial direction inside of the recliner, and the lower side engagement portion, are formed in circular arc shapes concentric with the recliner. This enables a wide engagement surface area to be secured when the second facing portion of the upper side engagement portion engages with the lower side engagement portion, while preventing unintentional interference between the lower side engagement portion and the upper side engagement portion during relative rotation of the upper frame member relative to the lower frame member.

The reclining device according to a sixth aspect of the present invention, wherein: the lower frame member includes a pair of contact portions in a row about the peripheral direction of the recliner; the extension member includes a stopper portion that is positioned between the pair of contact portions in the peripheral direction of the recliner; and a relative rotation range of the upper frame member relative to the lower frame member is restricted by contact between the stopper portion and the pair of contact portions.

In the reclining device described in the sixth aspect of the present invention, the extension member described above includes the stopper portion for restricting the relative rotation range of the upper frame member relative to the lower frame member. This enables the number of components to be fewer than in cases in which a member for restricting the relative rotation range (stopper member) as described above is provided separately to the extension member.

The reclining device according to a seventh aspect of the present invention, wherein the lower side engagement portion is configured by a portion of a flange that extends from an outer peripheral portion of the lower frame member toward an opposite side from the upper frame member.

In the reclining device described in the seventh aspect of the present invention, the lower side engagement portion is configured as described above, thereby enabling the lower side engagement portion to have the same simple configuration as hitherto.

A vehicle seat according to an eighth aspect of the present invention including: a seat cushion on which an occupant sits; a seatback that is provided at a rear end section of the seat cushion and that supports the back of the occupant; and the reclining device of any one of the first aspect to seventh aspect of the present invention, in which an inclination angle of the seatback is adjustable relative to the seat cushion.

The vehicle seat described in the eighth aspect of the present invention is provided with the reclining device described in any one of the first aspect to the seventh aspect, thereby enabling the advantageous effects described above to be obtained.

As explained above, the reclining device and the vehicle seat according to the present invention enable force in the detachment direction applied to the weld portions between the recliner and the frame members during input of load to the vehicle seat during a vehicle collision or the like to be reduced.

BRIEF DESCRIPTION OF THE DRAWINGS

Exemplary embodiments of the present invention will be described in detail based on the following figures, wherein.

DETAILED DESCRIPTION

Explanation follows regarding a vehicle seat 10 and a reclining device 12 according to an exemplary embodiment of the present invention, with reference to FIG. 1 to FIG. 14. Note that in the drawings, the arrow FR indicates the seat front direction, the arrow UP indicates the seat upper direction, and the arrow IN indicates the seat width direction inside. Unless specifically stated otherwise, simple reference to front-rear, left-right, and up-down directions in the below explanation refers to front-rear in the seat front-rear direction, left-right in the seat left-right direction (seat width direction), and up-down in the seat up-down direction.

As illustrated in FIG. 1 to FIG. 8, in the vehicle seat 10 according to the present exemplary embodiment, a seatback frame 20 is coupled to a seat cushion frame 18 through the reclining device 12, such that a inclination angle of the seatback frame 20 is adjustable. Note that the front-rear, left-right, and up-down directions of the vehicle seat 10 are aligned with the front-rear, left-right, and up-down directions of the vehicle.

The seat cushion frame 18 configures a frame of a seat cushion 14 on which an occupant sits, and the seatback frame 20 configures a frame of a seatback 16 that is provided at a rear end section of the seat cushion 14 and supports the back of the occupant. Note that it is configured to seat pads covered by covering members (none of which are illustrated in the drawings) are attached to the seatback frame 20 and the seat cushion frame 18, respectively. Explanation first follows regarding overall configuration of the vehicle seat 10, followed by explanation regarding relevant portions of the present exemplary embodiment.

The seat cushion frame 18 includes left and right side frame sections 22 (the side frame section 22 at the right side is omitted in FIG. 1 to FIG. 8), extending along the front-rear direction at left and right side sections of the seat cushion 14. Front end portions of the left and right side frame sections 22 are coupled together in the seat width direction by a front frame section, not illustrated in the drawings, and rear end portions of the left and right side frame sections 22 are coupled together in the seat width direction by a rear frame section 24. The left and right side frame sections 22 are coupled to a vehicle body floor section through a known lifter mechanism and seat slide mechanism, and are configured to up-down positions and front-rear positions relative to the vehicle body floor section can be adjusted.

B brackets 30 (the B bracket 30 at the right side is omitted in FIG. 1 to FIG. 8) are respectively fixed to the rear end portions of the left and right side frame sections 22 by bolts 32, and nuts, not illustrated in the drawings. The left and right B brackets 30 each correspond to a lower frame member, this being a configuration member of the reclining device 12. The B brackets 30 each configure a portion of the seatback frame 20 (a portion of the frame of the seatback 16), and project out from the rear end portions of the left and right side frame sections 22 toward the upper side. In the present exemplary embodiment, the left and right side frame sections 22, the front frame section, and the left and right B brackets 30 are each configured by sheet metal, and the rear frame section 24 is formed of metal pipe.

The seatback frame 20 includes left and right side frame sections 34 (the side frame section 34 on the right side is omitted in FIG. 1 to FIG. 8) extending along the up-down direction of the seatback 16 at left and right side sections of the seatback 16. Rear end portions of lower portions of the left and right side frame sections 34 are coupled together along the seat width direction by a back face panel 36, and upper end portions of the left and right side frame sections 34 are coupled together in the seat width direction by an upper frame section, not illustrated in the drawings. In the present exemplary embodiment, the left and right side frame sections 34 and the back face panel 36 are each formed of sheet metal, and the upper frame section is formed of metal pipe. In the present exemplary embodiment, the left and right side frame sections 34 each correspond to an upper frame member, this being a configuration member of the reclining device 12.

Lower end portions of the left and right side frame sections 34 are disposed at the seat width direction inside of the left and right B brackets 30. Recliners (reclining units) 38, these each being a configuration member of the reclining device 12, are respectively provided between the lower end portions of the left and right side frame sections 34 and the left and right B brackets 30. Note that since much of the configuration of the vehicle seat 10 is common to both the seat left side and the seat right side, the below description mainly explains configuration of the seat left side, and explanation regarding configuration of the seat right side is omitted.

Figure 3:
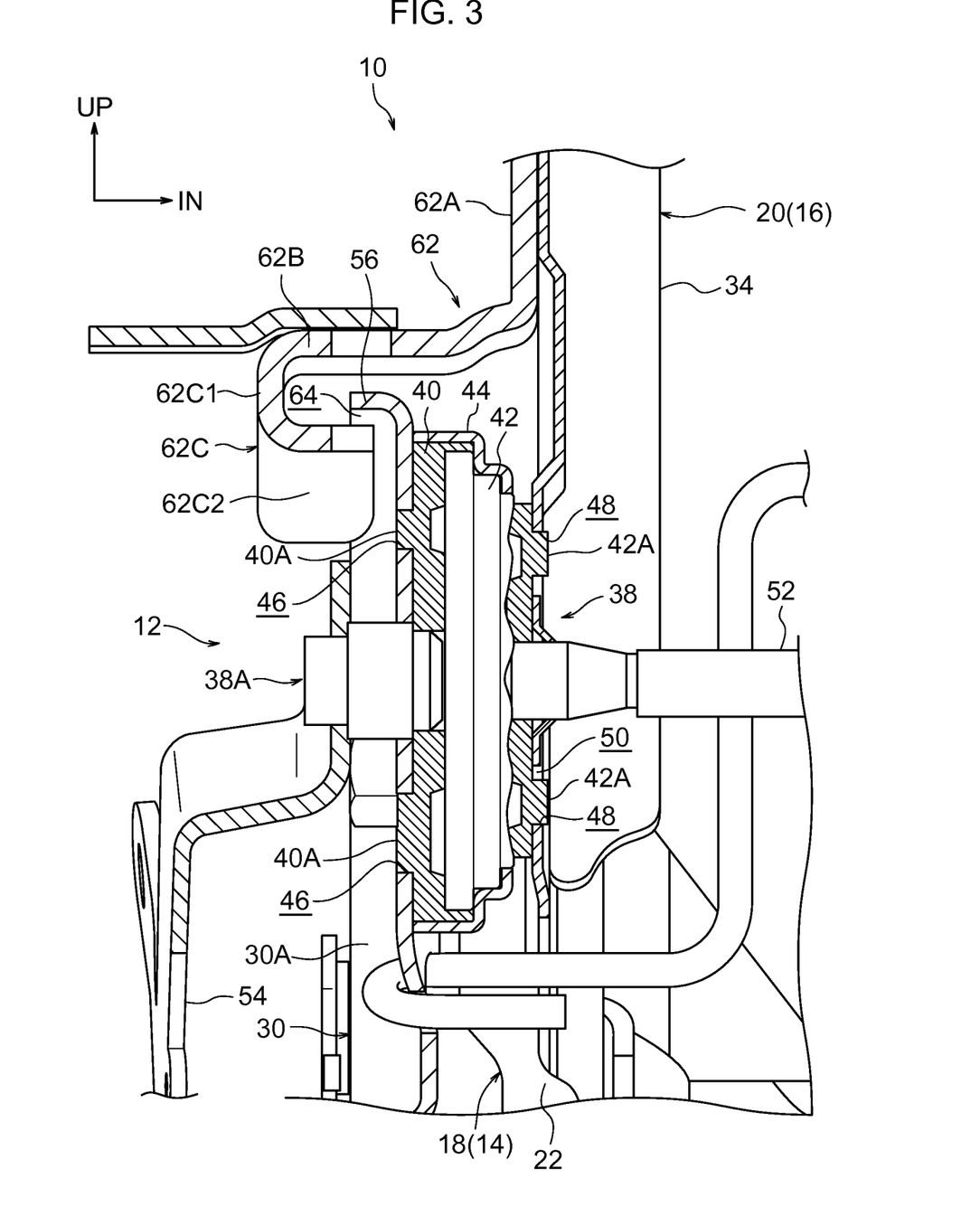
FIG. 3 is a vertical cross-section view illustrating a portion of the configuration illustrated in FIG. 2, cut away along the center axis of the recliner.

As illustrated in FIG. 3, each recliner 38 includes a base plate 40 serving as a first circular disc member positioned at the B bracket 30 side, and a ratchet plate 42 serving as a second circular disc member positioned at the side frame section 34 side. The base plate 40 and the ratchet plate 42 are each formed in a circular disc shape disposed oriented with its axial line direction along the seat width direction, and overlap each other so as to be coaxial and also capable of rotating relative to each other.

A tube shaped holder ring 44, serving as an attachment fitting, is fixed to an outer circumferential portion of the base plate 40, and an outer circumferential portion of the ratchet plate 42 is encircled by the holder ring 44. The base plate 40 and the ratchet plate 42 are thereby prevented from separating from each other. An angle adjustment mechanism, not illustrated in the drawings, for adjusting a relative rotation angle of the ratchet plate 42 relative to the base plate 40, is provided between the base plate 40 and the ratchet plate 42. The angle adjustment mechanism is a conventional, known mechanism, and detailed explanation is omitted.

A seat width direction outside face of the base plate 40, this being a face on an opposite side from the ratchet plate 42, overlaps with a seat width direction inside face of the B bracket 30. Plural (four in this example) embossed portions (first projections) 40A are formed projecting out toward the seat width direction outside at the seat width direction outside face of the base plate 40. The embossed portions 40A are in a row at equal intervals, or substantially equal intervals, around the circumferential direction of the base plate 40, namely, of the recliner 38.

Figure 1:
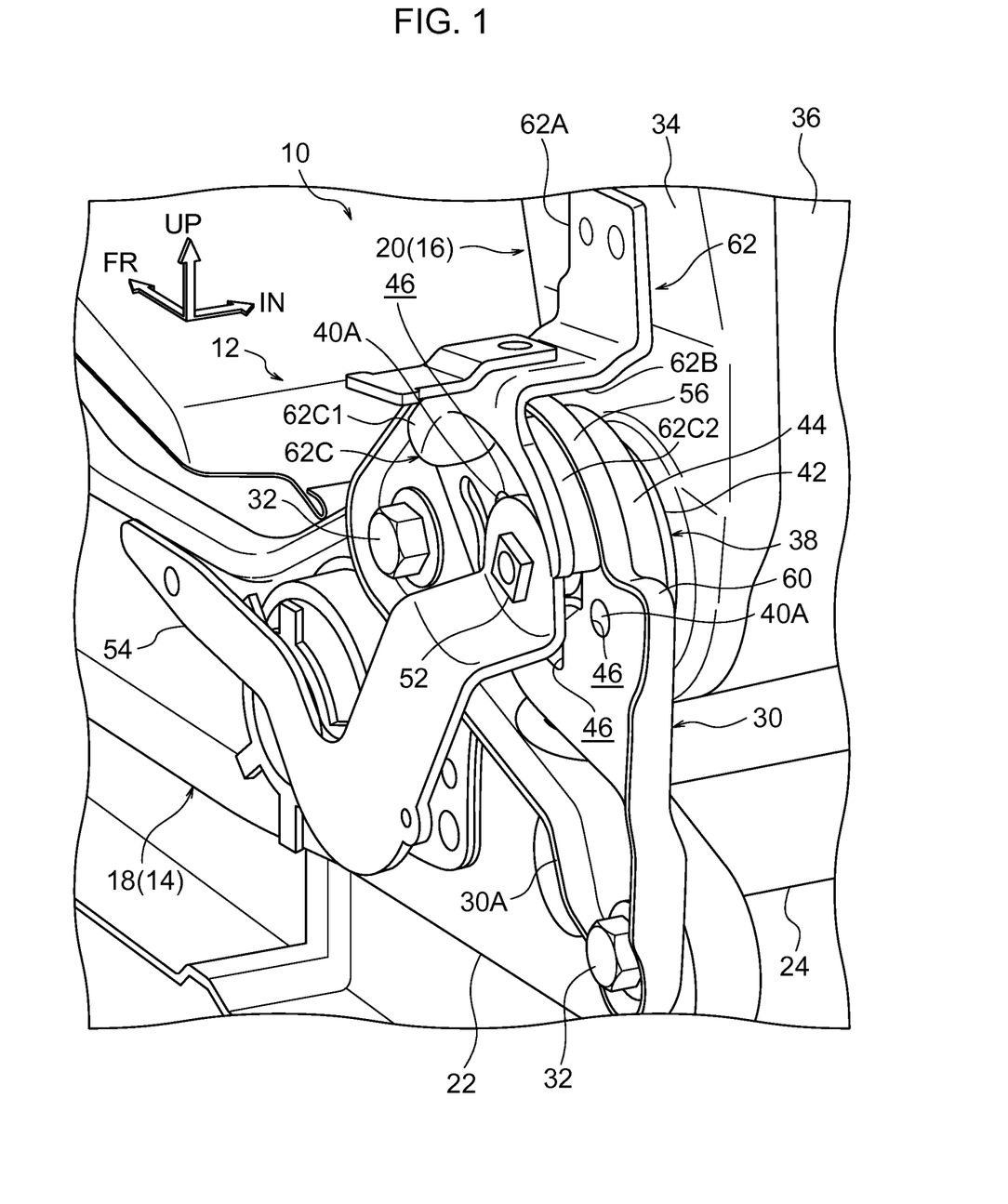
FIG. 1 is a perspective view illustrating a configuration peripheral to a recliner of a vehicle seat according to an exemplary embodiment of the present invention, in a state viewed diagonally from the seat rear side.
Figure 2:
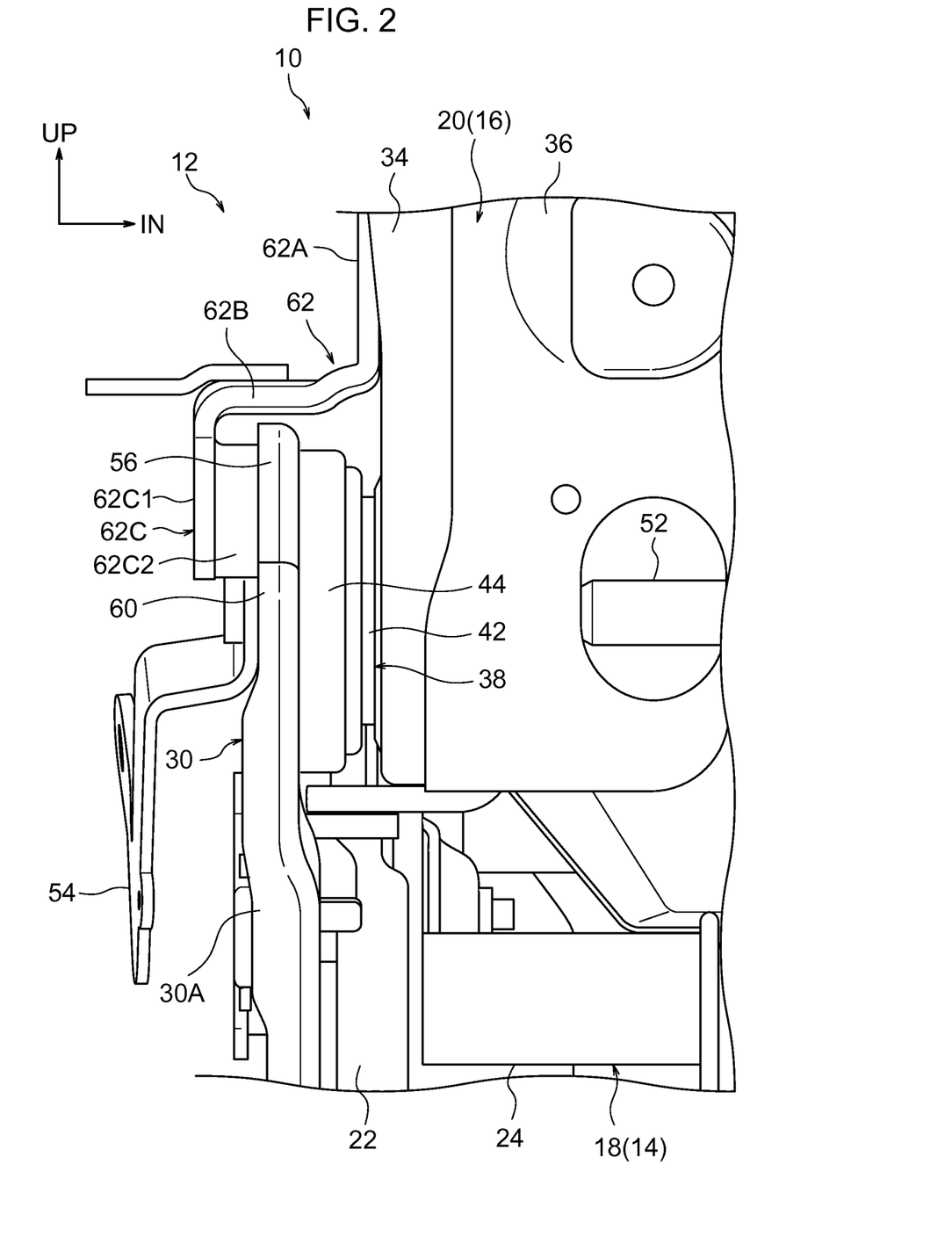
FIG. 2 is a back view illustrating the same configuration peripheral to the recliner, in a state viewed from the seat rear side.

The embossed portions 40A are formed by embossing processing, and as illustrated in FIG. 1, are each formed in a circular shape or a substantially rectangular shape viewed along the seat width direction. Plural first fitting holes (first fitting portions) 46 are formed to the B bracket 30 corresponding to the embossed portions 40A. The first fitting holes 46 are each formed in a circular shape or a substantially rectangular shape corresponding to the shape of the respective embossed portion 40A, and each embossed portion 40A is fitted into the respective fitting hole 46. In this fitted state, a leading end portion of each embossed portion 40A and a peripheral edge portion of the respective fitting hole 46 of the B bracket 30 are welded together by carbon dioxide gas arc welding, for example.

A seat width direction inside face of the ratchet plate 42, this being a face on an opposite side from the base plate 40, overlaps with a seat width direction outside face at the lower end portion of the side frame section 34. Plural (four in this example) embossed portions (second projections) 42A are formed projecting out toward the seat width direction inside at the seat width direction inside face of the ratchet plate 42. The embossed portions 42A are in a row at equal intervals, or substantially equal intervals, around the circumferential direction of the ratchet plate 42, namely of the recliner 38.

Figure 4:
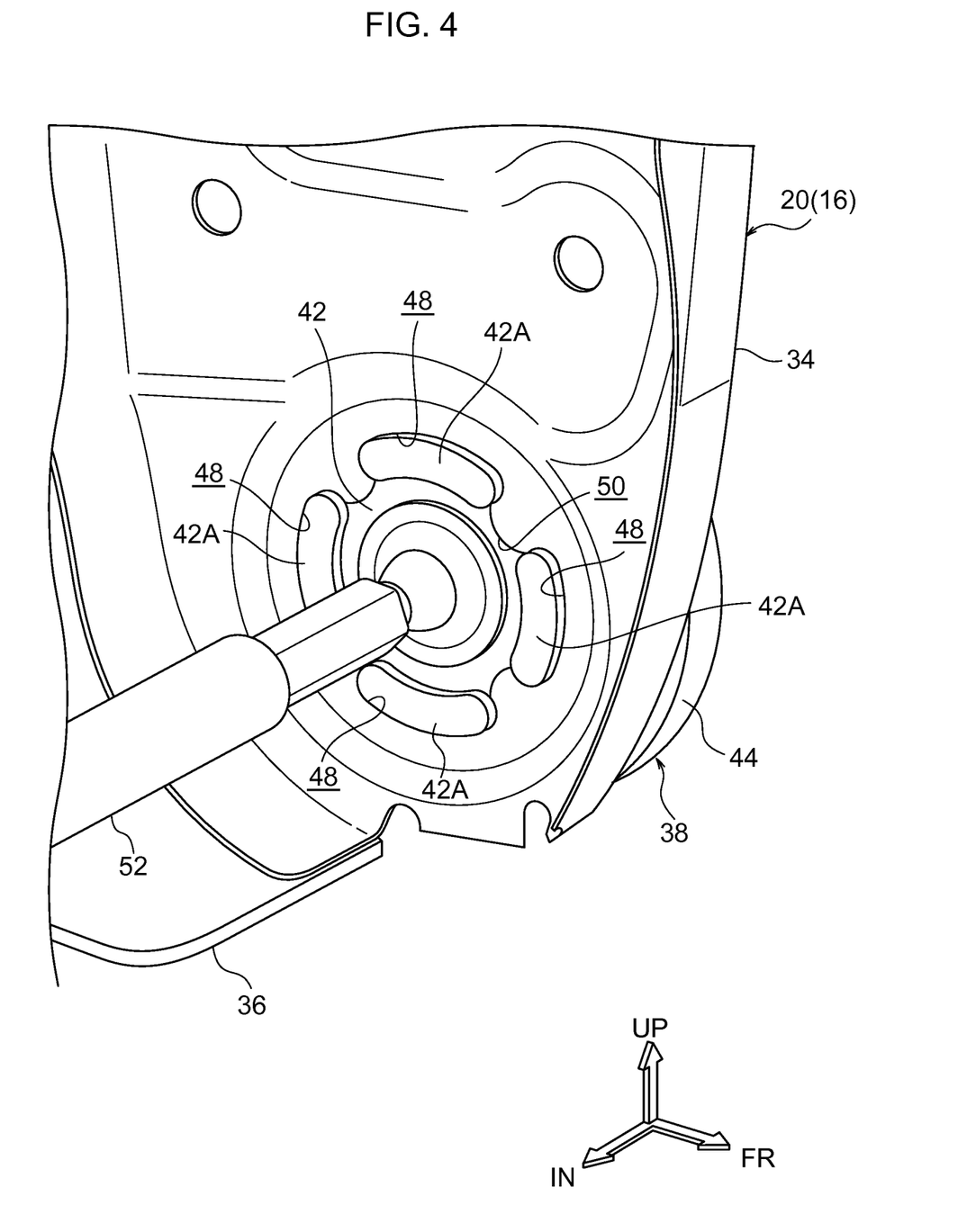
FIG. 4 is a perspective view illustrating a configuration peripheral to weld portions between a side frame section (upper frame member) of a seatback frame, and a recliner, provided to a vehicle seat, in a state viewed diagonally from the seat front side.

The embossed portions 42A are formed by embossing processing, and as illustrated in FIG. 4, are each formed in a circular arc shape concentric with the ratchet plate 42 as viewed along the seat width direction. Plural second fitting portions 48 are formed to the lower end portion of the side frame section 34 corresponding to the embossed portions 42A. The second fitting portions 48 are configured by cut-out portions formed to an outer peripheral portion of an opening 50 formed to the lower end portion of the side frame section 34. The second fitting portions 48 are each formed in a circular arc shape corresponding to the shape of the respective embossed portion 42A, and each embossed portion 42A is fitted into the respective second fitting portion 48. In this fitted state, a leading end portion of each embossed portion 42A and a peripheral edge portion of the respective second fitting portion 48 of the side frame section 34 are welded together by carbon dioxide gas arc welding, for example.

A center shaft 38A, this being a configuration component of the recliner 38, pierces through axial center portions of the base plate 40 and the ratchet plate 42. An axial line direction end portion of a connecting rod 52 is coupled to the center shaft 38A so as to be incapable of rotating relative to the center shaft 38A. The connecting rod 52 is bridged between the left and right recliners 38. The angle adjustment mechanisms of the left and right recliners 38 are coupled together by the connecting rod 52. One axial line direction end portion of the center shaft 38A (the seat left side end portion in this example) pierces through the B bracket 30 and projects out toward the seat left side of the B bracket 30. A lock release lever 54 is fixed to this projecting portion. When the center shaft 38A is rotated in one direction by a specific amount about its axial line by operating the lock release lever 54, the connecting rod 52 rotates in the same direction, the center shaft 38A at the seat right side rotates, and locking of the angle adjustment mechanisms of the left and right recliners 38 is released accompanying this. This enables adjustment of the rotation angle of the ratchet plate 42 relative to the base plate 40, namely, adjustment of the inclination angle of the seatback frame 20 with respect to the seat cushion frame 18.

Relevant Portions of Present Exemplary Embodiment

Explanation follows regarding relevant portions of the present exemplary embodiment.

In the present exemplary embodiment, the B bracket 30 previously described is disposed oriented with its plate thickness direction in the seat width direction; however, a flange 30A extends out toward the seat width direction outside from an outer peripheral portion of the B bracket 30. The plane stiffness of the B bracket 30 is increased by the flange 30A. An upper portion of the flange 30A configures a lower side engagement portion 56. The lower side engagement portion 56 is formed in a circular arc shape concentric with the recliner 38.

A front side contact portion 58 and a rear side contact portion 60, serving as a pair of contact portions, are formed to the B bracket 30 at the front and rear of the lower side engagement portion 56. The front side contact portion 58 and the rear side contact portion 60 are in a row around the circumferential direction of the recliner 38, and project out toward the radial direction outside of the recliner 38 with respect to the lower side engagement portion 56. The lower side engagement portion 56, the front side contact portion 58, and the rear side contact portion 60 correspond to a catcher 62, serving as an extension member extending out from the lower end portion of the side frame section 34 toward the B bracket 30 side (seat width direction outside).

The catcher 62 is formed by pressing sheet metal, for example, and is disposed at the seatback 16 upper side with respect to the B bracket 30 and the recliner 38. A fixing portion 62A is provided at a seat width direction inside end portion of the catcher 62. The fixing portion 62A is formed in a rectangular plate shape with its plate thickness direction in the seat width direction, and is fixed to the seat width direction outside face of the lower end portion of the side frame section 34 by a means such as welding. A stopper portion 62B extends toward the seat width direction outside from a lower end portion of the fixing portion 62A.

The stopper portion 62B is formed in a plate shape with its plate thickness direction in the up-down direction of the seatback 16, and faces the lower side engagement portion 56 of the B bracket 30 from the upper side of the seatback 16 across a gap. The stopper portion 62B is positioned between the front side contact portion 58 and the rear side contact portion 60 about the circumferential direction of the recliner 38, and projects further toward the seat width direction outside than the B bracket 30. An upper side engagement portion 62C extends out from a seat width direction outside end portion of the stopper portion 62B.

The upper side engagement portion 62C faces the lower side engagement portion 56 from an opposite side from the side frame section 34 (the seat width direction outside), and is capable of engaging with the lower side engagement portion 56. The upper side engagement portion 62C includes an outside facing portion 62C1, serving as a first facing portion extending from a seat width direction outside end portion of the stopper portion 62B toward the lower side of the seatback 16. The outside facing portion 62C1 extends toward the front side of the seatback 16 and rear side with respect to the stopper portion 62B, and curves in a circular arc shape concentric with the recliner 38. The outside facing portion 62C1 faces the lower side engagement portion 56 from the seat width direction outside, and as illustrated in FIG. 5, a length dimension of the outside facing portion 62C1 along the curve direction is set the same as a length dimension along the curve direction of the lower side engagement portion 56.

A lower side facing portion 62C2 extends out toward the seat width direction inside from a lower end portion of the outside facing portion 62C1. The lower side facing portion 62C2 curves in a circular arc shape concentric with the recliner 38, similarly to the outside facing portion 62C1. The lower side facing portion 62C2 extends from the entire lower end portion (a lower end edge portion) of the outside facing portion 62C1, and as illustrated in FIG. 5, a length dimension of the lower side facing portion 62C2 along the curve direction is set the same as the length dimension along the curve direction of the lower side engagement portion 56. As illustrated in FIG. 3, a seat width direction inside end portion of the lower side facing portion 62C2 faces and approaches the lower side engagement portion 56 from the radial direction inside of the recliner 38 (the lower side of the seatback 16). A gap 64, forming a circular arc shape concentric with the recliner 38, is formed between the lower side facing portion 62C2 and the lower side engagement portion 56 (see FIG. 3 and FIG. 5). A dimension of the gap 64 along the radial direction of the recliner 38 is set, for example, at approximately several millimeters.

Figure 5:
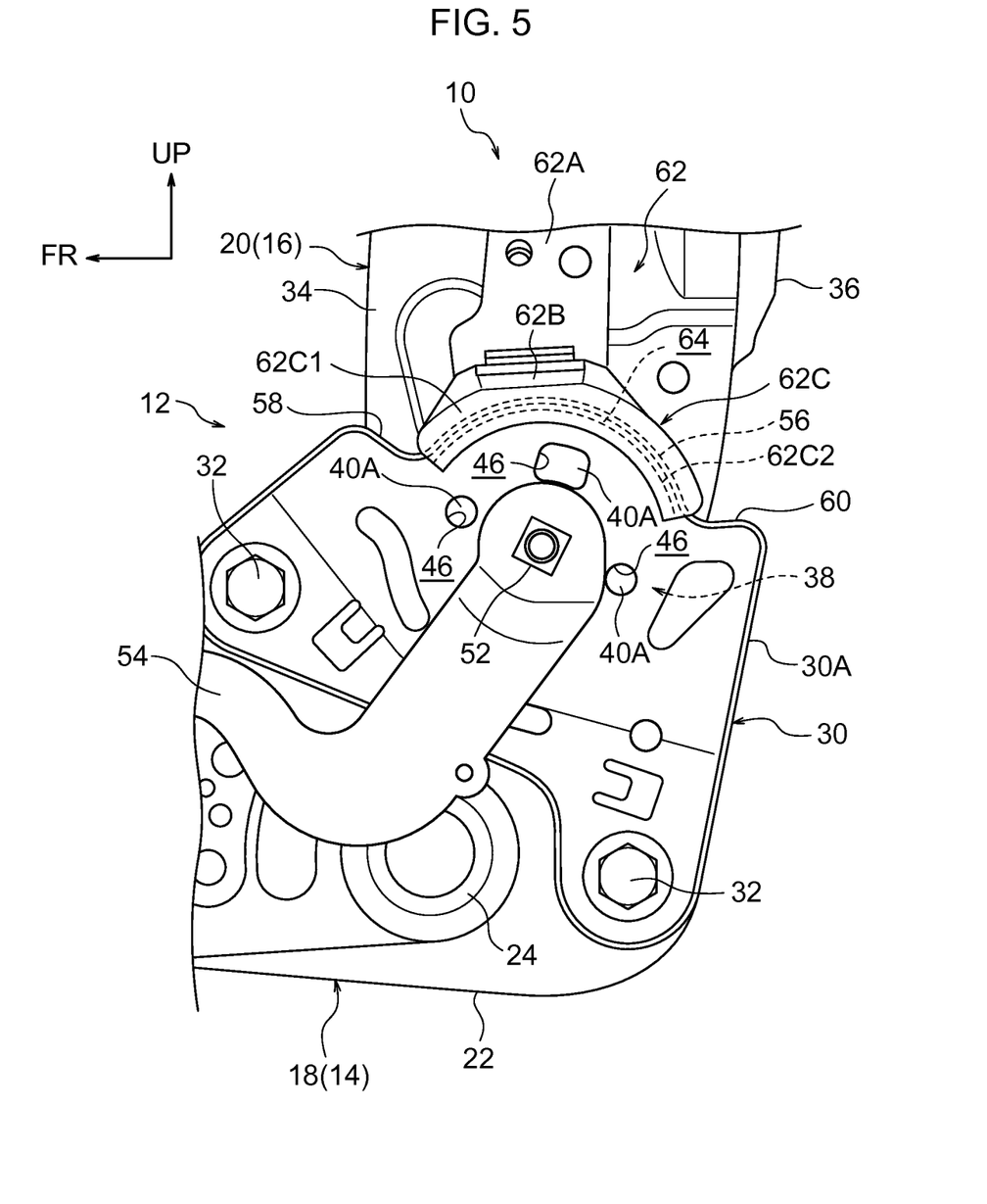
FIG. 5 is a side view of the configuration illustrated in FIG. 1 viewed from the seat width direction outside, illustrating a state in which a seatback frame is positioned in a design reference position.
Figure 6:
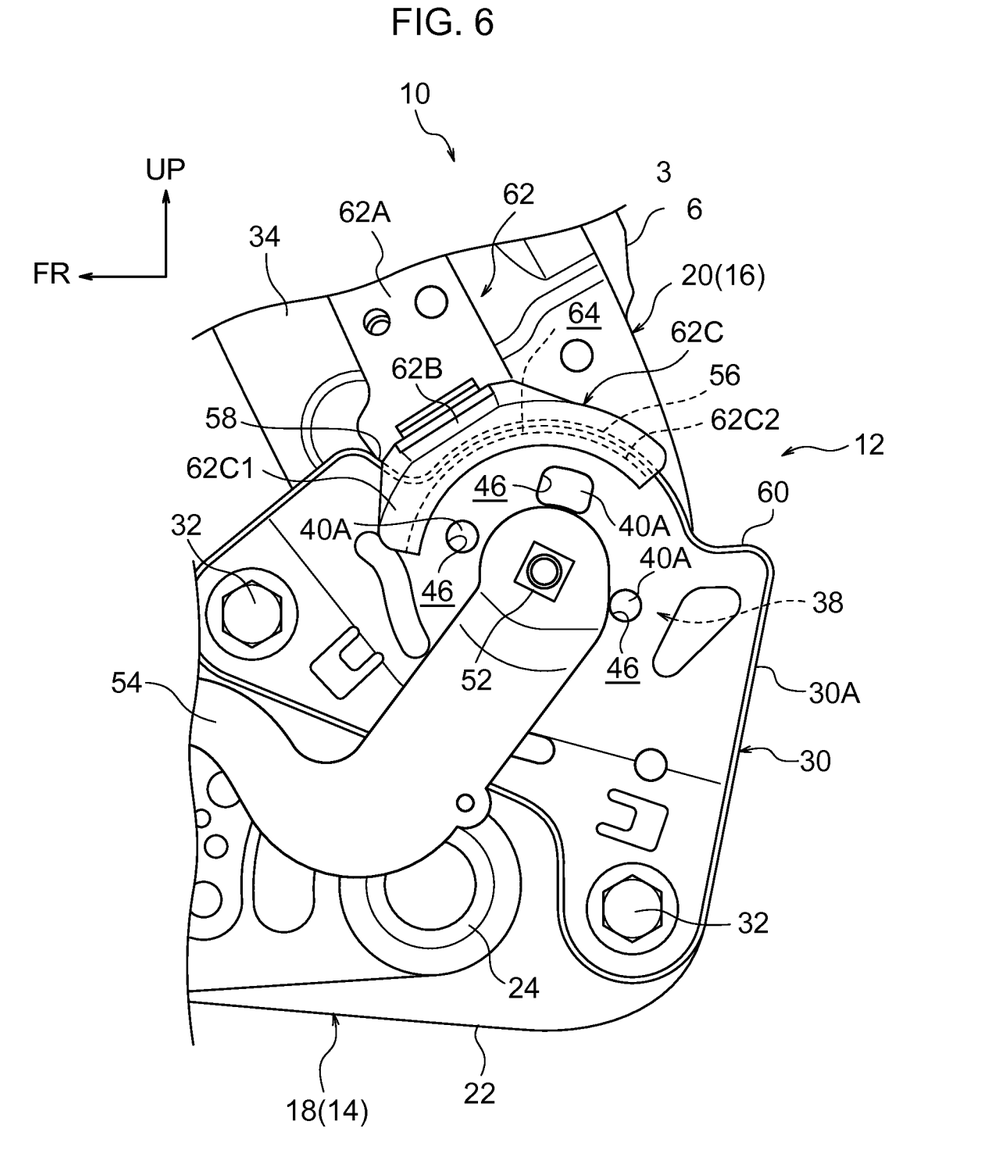
FIG. 6 is a side view corresponding to FIG. 5, illustrating a state in which a seatback frame is positioned in a frontmost position.
Figure 7:
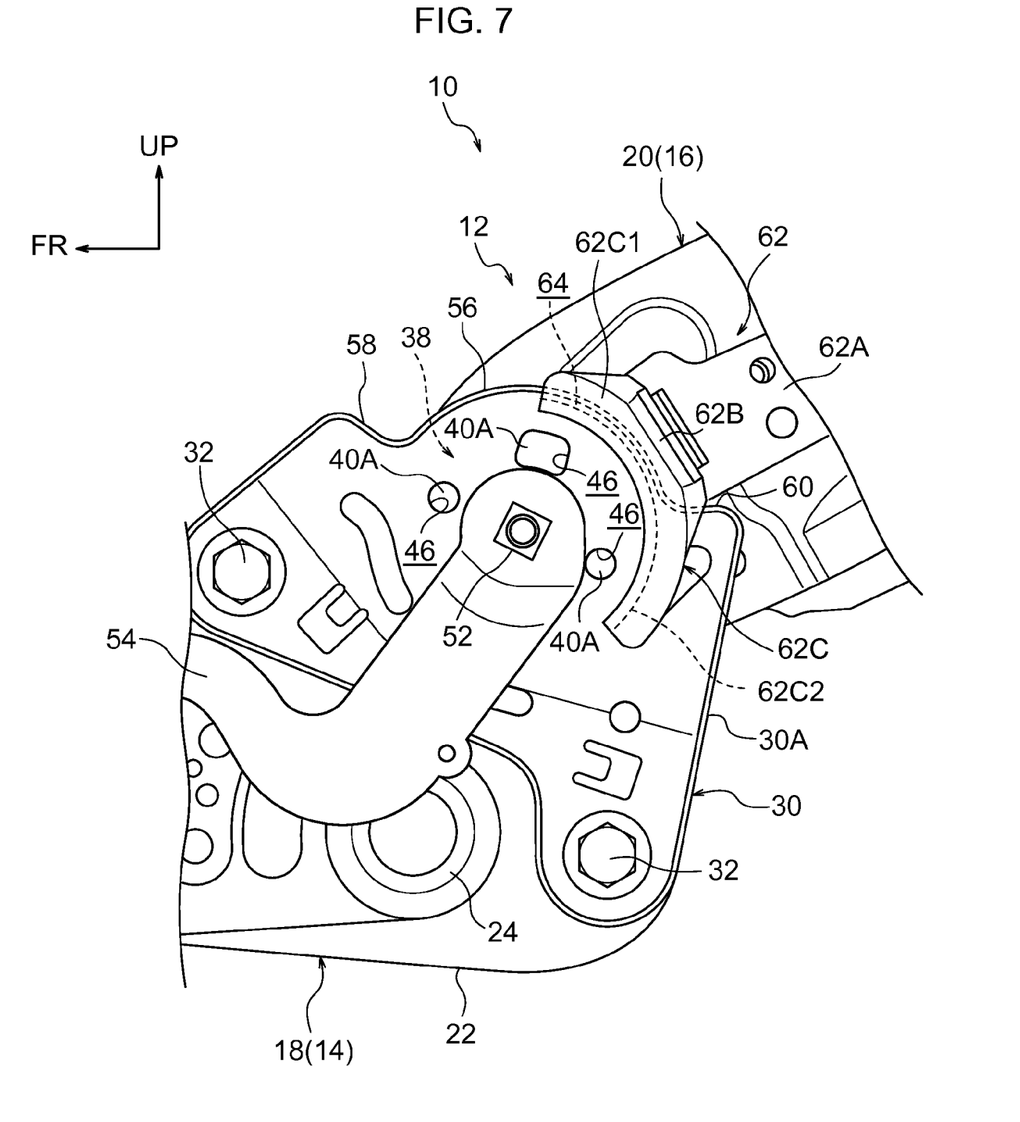
FIG. 7 is a side view corresponding to FIG. 5, illustrating a state in which a seatback frame is positioned in a rearmost position.

In the vehicle seat 10 with the above configuration, the upper side engagement portion 62C is set so as to face the lower side engagement portion 56 from an opposite side from the side frame section 34 (the seat width direction outside), so as to be capable of engaging with the lower side engagement portion 56, across the entire range of relative rotation of the side frame section 34 relative to the B bracket 30 (see FIG. 5 to FIG. 7). Since the lower side engagement portion 56 and the lower side facing portion 62C2 both curve in a circular arc shape concentric with the recliner 38, the lower side facing portion 62C2 and the lower side engagement portion 56 do not interfere with each other when the seatback frame 20 rotates about the recliner 38 with respect to the seat cushion frame 18.

In the vehicle seat 10, configuration is such that a rotation range of the seatback frame 20 with respect to the seat cushion frame 18 is restricted by contact between the stopper portion 62B of the catcher 62, and the front side contact portion 58 and the rear side contact portion 60 of the B bracket 30.

Figure 8:
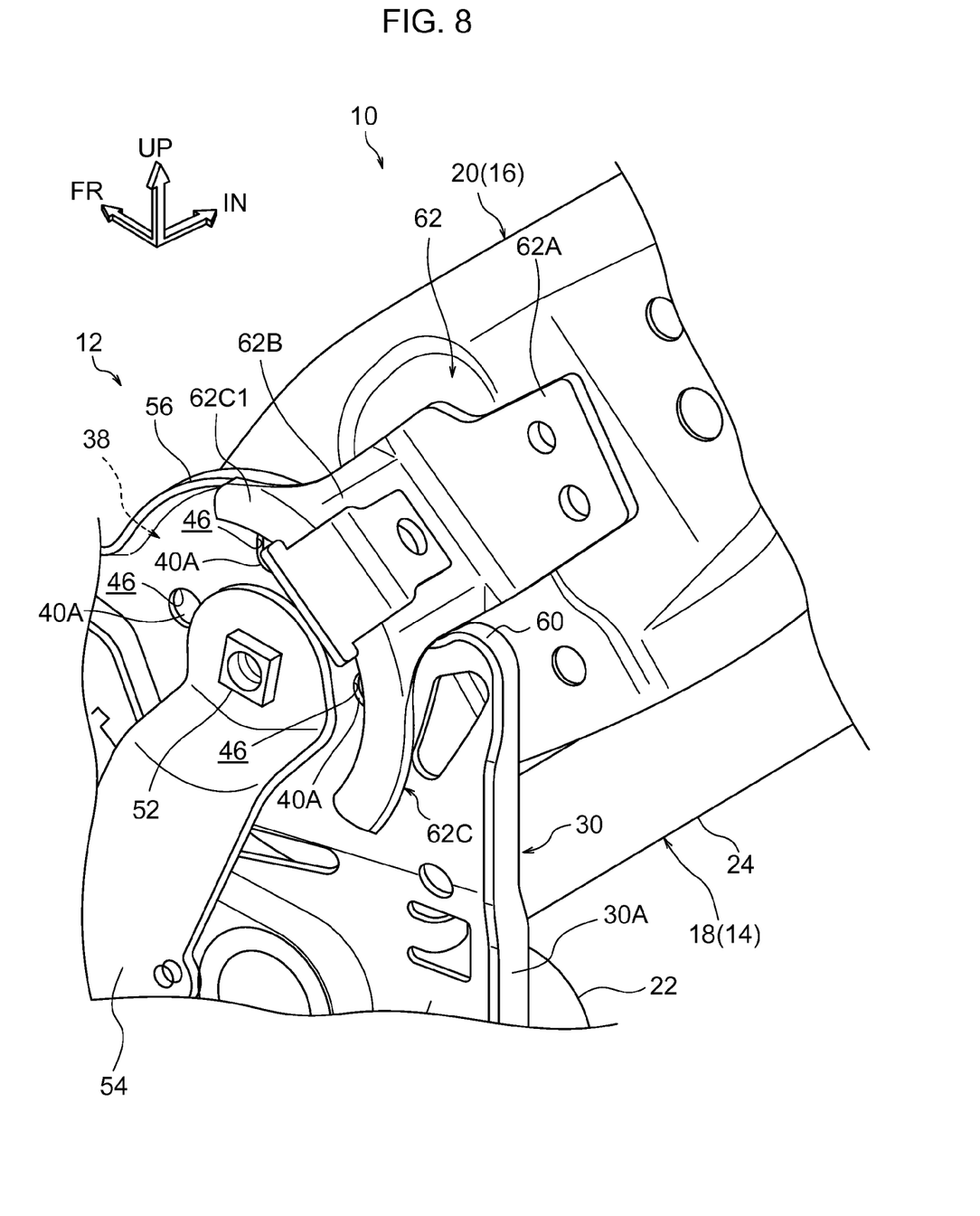
FIG. 8 is a perspective view illustrating the configuration illustrated in FIG. 7, in a state viewed diagonally from the seat rear side.

Specifically, as illustrated in FIG. 5, in a state in which the seatback frame 20 is positioned in a design reference position with respect to the seat cushion frame 18, the catcher 62 is provided such that the stopper portion 62B is separated from both the front side contact portion 58 and the rear side contact portion 60. As illustrated in FIG. 6, when the seatback frame 20 is then rotated to a frontmost position with respect to the seat cushion frame 18, the stopper portion 62B contacts the front side contact portion 58. Configuration is thereby such that forward tilt of the seatback frame 20 further toward the seat front side than the frontmost position is restricted. As illustrated in FIG. 7 and FIG. 8, when the seatback frame 20 is rotated to a rearmost position with respect to the seat cushion frame 18, the stopper portion 62B contacts the rear side contact portion 60. Configuration is thereby such that rearward tilt of the seatback frame 20 further toward the seat rear side than the rearmost position is restricted.

Figure 9:
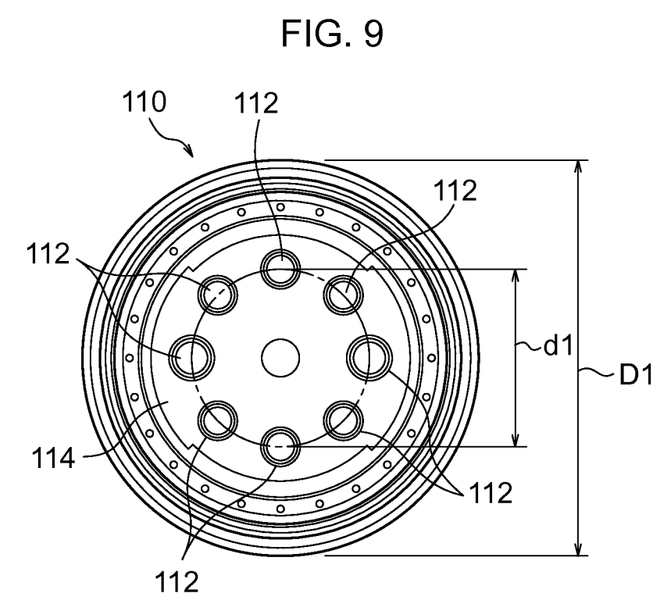
FIG. 9 is a side view illustrating a conventional recliner.
Figure 10:
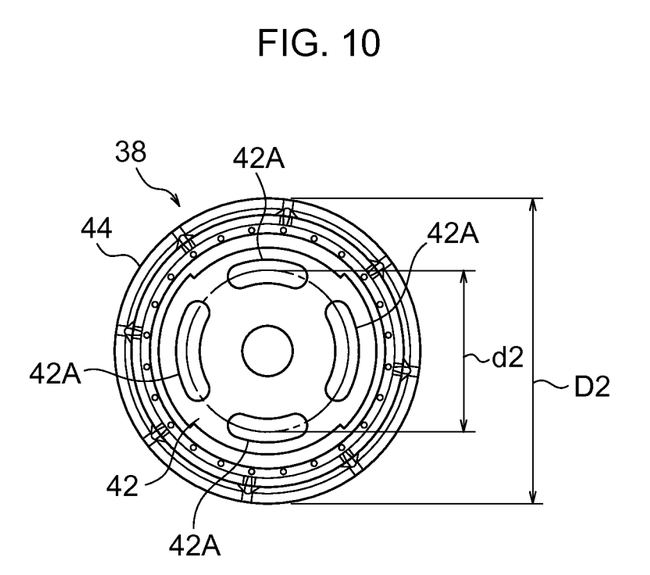
FIG. 10 is a side view illustrating a recliner according to an exemplary embodiment of the present invention.

As illustrated in FIG. 9 and FIG. 10, in the present exemplary embodiment, the recliner 38 described above is formed with a smaller shape (smaller diameter) than a conventional recliner 110. Specifically, a diameter D1 of the conventional recliner 110 is set at 80.9φ, for example, and a diameter d1 (weld portion diameter) of a hypothetical circle passing through the centers of plural embossments 112 formed to a ratchet plate 114 is set at 36φ, for example. In contrast thereto, a diameter D2 of the recliner 38 according to the present exemplary embodiment is set at 62φ, for example, and a diameter d2 (weld portion diameter) of a hypothetical circle passing through the centers of the plural embossed portions 42A formed to the ratchet plate 42 is set at 32φ, for example.

Moreover, in the present exemplary embodiment, the B bracket 30 and the side frame section 34 are configured thinner (with a thinner thickness) than hitherto. Specifically, the plate thickness of a conventional B bracket 30 is set at 2.3 millimeters, for example, whereas the plate thickness of the B bracket 30 according to the present exemplary embodiment is set at 2.0 millimeters, for example. Moreover, the plate thickness of a conventional side frame section 34 is set at 1.2 millimeters, for example, whereas the plate thickness of the side frame section 34 according to the present exemplary embodiment is set at 1.0 millimeters, for example.

Operation and Advantageous Effects

Explanation follows regarding operation and advantageous effects of the present exemplary embodiment.

In the present exemplary embodiment, the B bracket 30 configuring a portion of the seatback frame 20, and the lower end portion of the side frame section 34 configuring a portion of the seatback frame 20 are coupled together such that the relative rotation angle therebetween is adjustable using the recliner 38 welded to both members. The B bracket 30 is provided with the lower side engagement portion 56 formed in a circular arc shape concentric with the recliner 38. In addition, the catcher 62 extending out from the lower end portion of the side frame section 34 is provided with the upper side engagement portion 62C that faces the lower side engagement portion 56 from an opposite side from the side frame section 34 (the seat width direction outside), so as to be capable of engaging with the lower side engagement portion 56.

Thus, in the event of an excessive load toward the seat rear side acting on the seatback frame 20 of the seatback 16 when the vehicle is rear-ended, for example, the upper side engagement portion 62C engages (enmeshes) with the lower side engagement portion 56 from an opposite side from the side frame section 34. This suppresses the side frame section 34 and the B bracket 30 from separating from each other. Namely, due to the recliner 38 being clamped between the B bracket 30 and the side frame section 34 by the catcher 62 fixed to the side frame section 34, the distances between the recliner 38 and the B bracket 30, and between the recliner 38 and the side frame section 34, are physically maintained.

This enables force in a detachment direction, applied to weld portions between the plural embossed portions 40A of the recliner 38 and the B bracket 30, and to the weld portions between the plural embossed portions 42A of the recliner 38 and the side frame section 34, to be reduced. Thus the present exemplary embodiment enables the strength of each of the above weld portions to be secured, while achieving the smaller diameter recliner 38 and the thinner B bracket 30 and side frame section 34.

Figure 11:
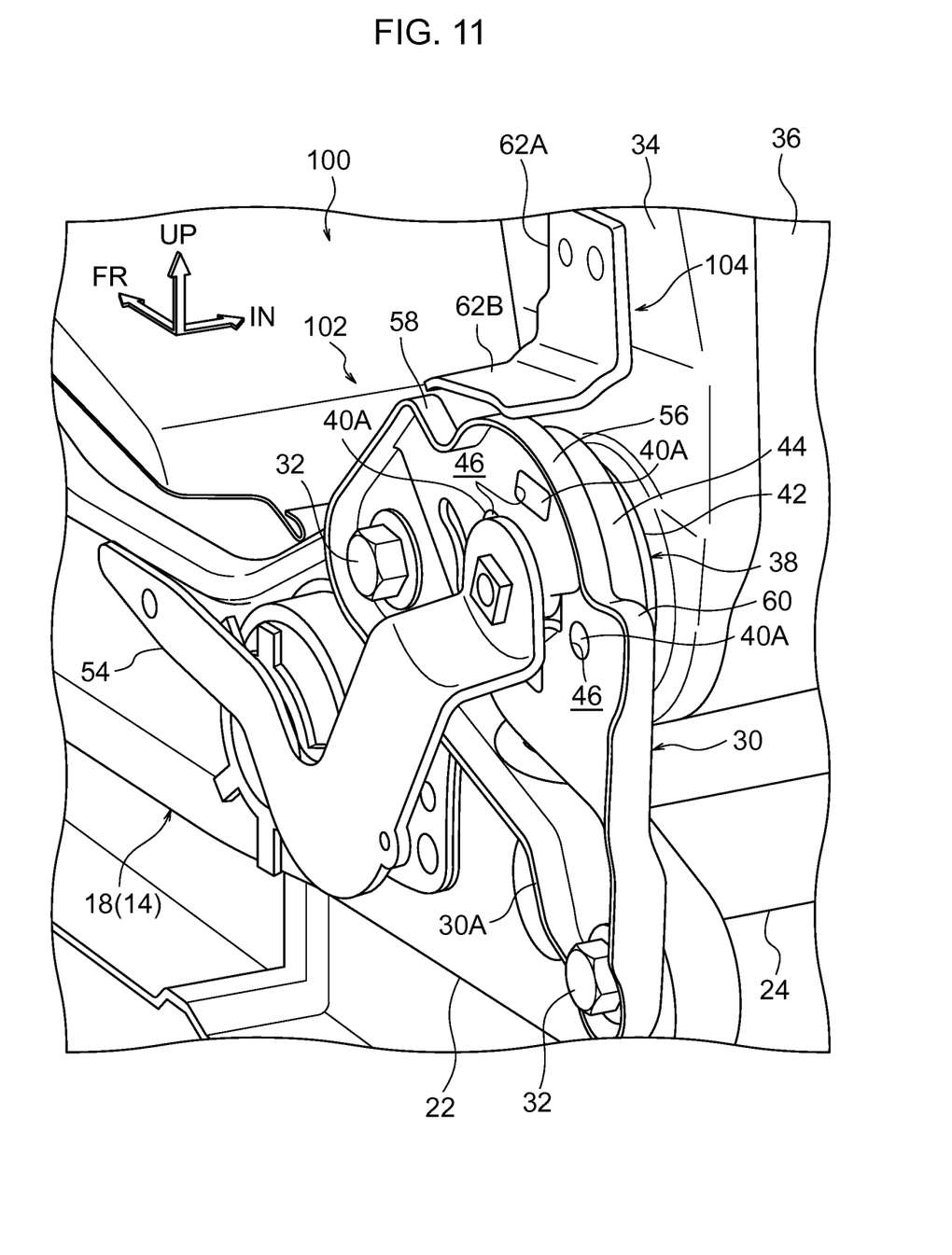
FIG. 11 is a perspective view corresponding to FIG. 1, illustrating a configuration peripheral to a recliner of a vehicle seat according to a Comparative Example.

Explanation follows regarding the above advantageous effect, with reference to a vehicle seat 100 (a Comparative Example) illustrated in FIG. 11. The vehicle seat 100 achieves a smaller diameter recliner 38, and a thinner B bracket 30 and side frame section 34, similarly to the vehicle seat 10 according to the present exemplary embodiment. However, in the vehicle seat 100, a reclining device 102 is provided with a stopper member 104 instead of the catcher 62 according to the present exemplary embodiment. The stopper member 104 is provided with a fixing portion 62A and a stopper portion 62B similar to the fixing portion 62A and the stopper portion 62B of the catcher 62; however, the upper side engagement portion 62C is omitted. Other configuration of the vehicle seat 100 is similar to the vehicle seat 10 according to the present exemplary embodiment.

In the vehicle seat 100 according to the Comparative Example, since the recliner 38 has a smaller diameter similarly to in the present exemplary embodiment, weld lengths between the recliner 38 and the B bracket 30, and between the recliner 38 and the side frame section 34 are shorter than hitherto. In particular, the weld lengths of weld portions W between embossed portions 42A and the side frame section 34 illustrated in FIG. 12 (omitted from illustration other than in FIG. 12) are shorter. Thus the weld strength between the recliner 38 and the side frame section 34 is particularly lower than hitherto.

Figure 12:
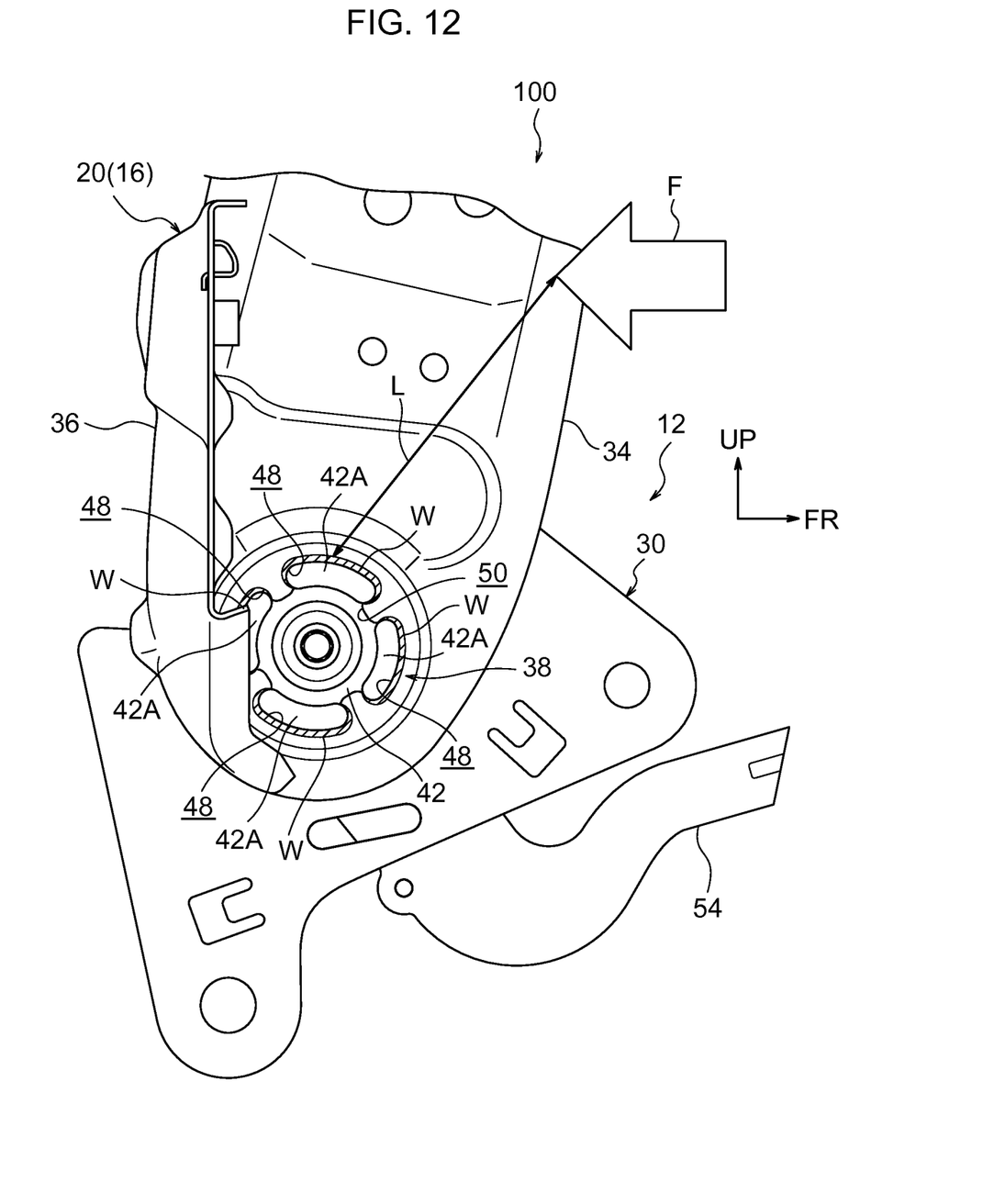
FIG. 12 is a side view illustrating a configuration peripheral to a recliner of a vehicle seat according to a Comparative Example, as viewed from the seat width direction inside, for explaining a situation in which load toward the seat rear side acts on a seatback frame.

In the vehicle seat 100, since the recliner 38 has a smaller diameter, a distance L between a point where a load F is input to the seatback frame 20 when the vehicle is rear-ended, and the weld portion W of the recliner 38, is longer than hitherto. Thus moment generated at the weld portions W during input of the load F is greater than hitherto.

Furthermore, in the vehicle seat 100, since the B bracket 30 and the side frame section 34 are thinner than hitherto, the weld strength between the recliner 38 and the B bracket 30, and between the recliner 38 and the side frame section 34, is lower than hitherto, due to a reduction in the plate thicknesses of the B bracket 30 and the side frame section 34. Note that, in addition to lower weld strength simply due to the reduction in plate thicknesses, in cases in which the B bracket 30 and the side frame section 34 are made of high tensile steel plate, the weld strength is also lower due to becoming brittle during welding, due to changes in the material. This similarly applies to the vehicle seat 10 according to the present exemplary embodiment.

Figure 13:
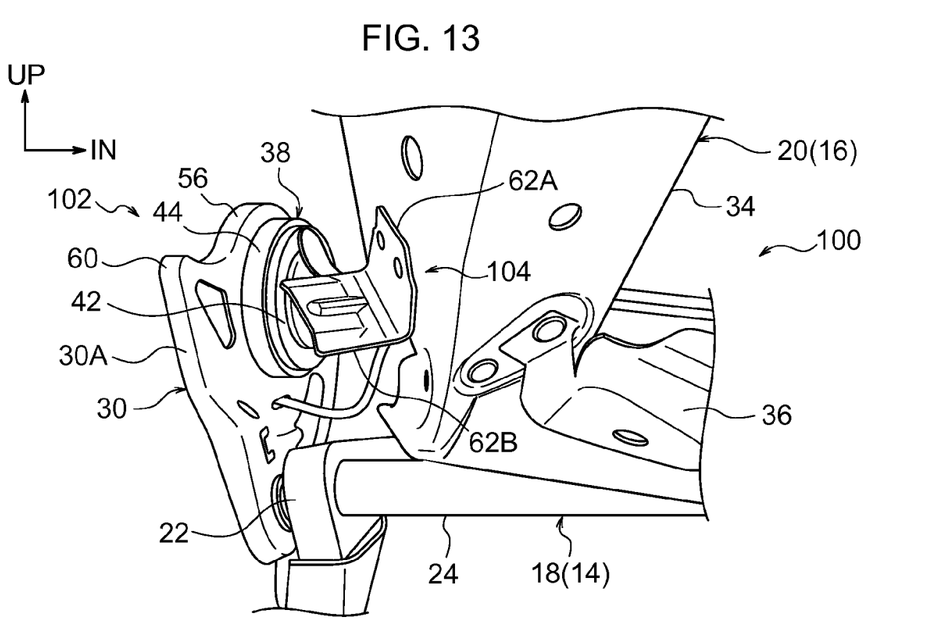
FIG. 13 is a back view illustrating a situation in which the periphery of a recliner is damaged due to load toward the seat rear side being applied to a seatback frame in a vehicle seat according to a Comparative Example, in a state viewed diagonally from the seat rear side.

In the vehicle seat 100 described above, the stopper member 104 is provided instead of the catcher 62 according the present exemplary embodiment previously described. When excessive load F toward the seat rear side acts on a seatback frame 20 of the vehicle seat 100, the weld portions between the recliner 38 and the side frame section 34 are damaged as illustrated in FIG. 13, since the advantageous effect of suppressing the side frame section 34 and the B bracket 30 from separating from each other using the catcher 62 is not obtained. This results in large deformation of the seat cushion frame 18 and the seatback frame 20.

Figure 14:
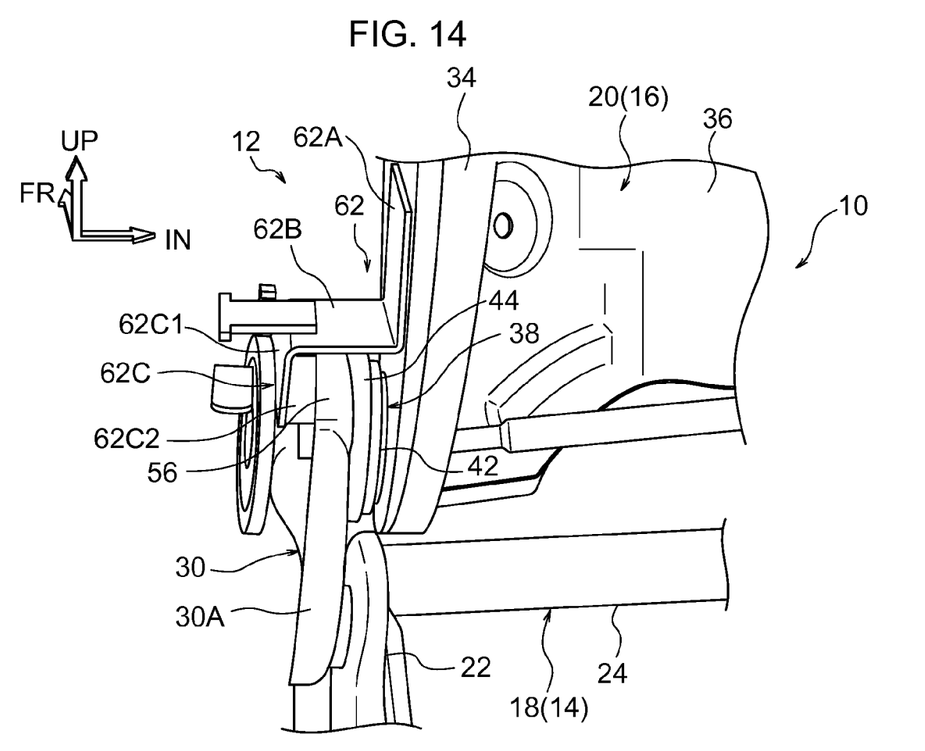
FIG. 14 is a perspective view illustrating a situation in which damage to the periphery of a recliner is suppressed, even when load toward the seat rear side is applied to a seatback frame of a vehicle seat according to an exemplary embodiment of the present invention, in a state viewed diagonally from the seat rear side.

In contrast thereto, in the present exemplary embodiment, even when excessive load F toward the seat rear side acts on the seatback frame 20, damage to the weld portions between the recliner 38 and the side frame section 34 is prevented or suppressed as illustrated in FIG. 14, since the side frame section 34 and the B bracket 30 are suppressed from separating from each other by the catcher 62. This accordingly enables deformation of the seat cushion frame 18 and the seatback frame 20 to be reduced.

In the present exemplary embodiment, the upper side engagement portion 62C of the catcher 62 faces the lower side engagement portion 56 from the seat width direction outside (an opposite side from the side frame section 34), so as to be capable of engaging with the lower side engagement portion 56, across the entire range of relative rotation of the seatback frame 20 relative to the seat cushion frame 18. This enables the advantageous effect previously described to be obtained, regardless of the inclination angle of the seatback 16 with respect to the seat cushion 14.

In addition, in the present exemplary embodiment, the upper side engagement portion 62C includes the outside facing portion 62C1 facing the lower side engagement portion 56 of the B bracket 30 from an opposite side from the side frame section 34, and the lower side facing portion 62C2 facing the lower side engagement portion 56 from the radial direction inside of the recliner 38. Thus, during input of load to the seatback frame 20 due to a vehicle collision or the like, the outside facing portion 62C1 and the lower side facing portion 62C2 engage with the lower side engagement portion 56 from an opposite side from the side frame section 34 and from the radial direction inside of the recliner 38, thereby enabling the side frame section 34 and the B bracket 30 to be effectively suppressed from separating from each other.

Further, in the present exemplary embodiment, the relative rotation range of the side frame section 34 relative to the B bracket 30, namely, a relative rotation range of the seatback frame 20 relative to the seat cushion frame 18, is restricted by contact between the stopper portion 62B provided to the catcher 62, and the front side contact portion 58 and the rear side contact portion 60 provided to the B bracket 30. Namely, in the present exemplary embodiment, the catcher 62, which protects the weld portions of the recliner 38 during a vehicle collision, includes the stopper portion 62B for restricting the relative rotation range of the side frame section 34 relative to the B bracket 30. This enables the number of components to be fewer than in cases in which a member for restricting the relative rotation range described above is provided separately to the catcher 62.

In the present exemplary embodiment, both the lower side facing portion 62C2 facing the lower side engagement portion 56 of the B bracket 30 from the radial direction inside of the recliner 38, and the lower side engagement portion 56, are formed in circular arc shapes concentric with the recliner 38. This enables a wide engagement surface area to be secured during engagement between the upper side engagement portion 62C and the lower side engagement portion 56, while preventing unintentional interference between the lower side engagement portion 56 and the lower side facing portion 62C2 during relative rotation of the seatback frame 20 relative to the seat cushion frame 18.

In the present exemplary embodiment, the lower side engagement portion 56 is configured by a portion of the flange 30A extending out from the outer peripheral portion of the B bracket 30. The lower side engagement portion 56 can accordingly have the same simple configuration as hitherto.

The present invention has been explained above with reference to an exemplary embodiment; however various modifications may be implemented within a range not departing from the spirit of the present invention. Obviously the scope of rights of the present invention is not limited by the above exemplary embodiment.

What is claimed is:

1. A reclining device comprising:
   a lower frame member that configures a portion of a frame of a vehicle seat;
   an upper frame member that configures a portion of the frame of the vehicle seat;
   a recliner that is provided between and welded to both the lower frame member and the upper frame member, and that couples the upper frame member to the lower frame member such that a relative rotation angle of the upper frame member is adjustable relative to the lower frame member;
   a lower side engagement portion that is configured by a portion of a flange that extends from an outer peripheral portion of the lower frame member toward an opposite side from the upper frame member and that is formed in a circular arc shape that is concentric with the recliner; and
   an extension member that extends from the upper frame member toward a lower frame member side, and that includes an upper side engagement portion so as to be capable of engaging with the lower side engagement portion, the upper side engagement portion including:

a first facing portion that faces the lower side engagement portion to be capable of engaging from the opposite side from the upper frame member, and a second facing portion that faces the lower side engagement portion to be capable of engaging from a radial direction inside of the recliner, the second facing portion being formed in a circular arc shape that is concentric with the recliner; and a gap, forming a circular arc shape concentric with the recliner, being formed between the second facing portion and the lower side engagement portion.

2. The reclining device of claim 1, wherein the upper side engagement portion faces the lower side engagement portion so as to be capable of engaging with the lower side engagement portion across an entire relative rotation range of the upper frame member relative to the lower frame member.

3. The reclining device of claim 1, wherein:

the lower frame member includes a pair of contact portions in a row about the peripheral direction of the recliner;

the extension member includes a stopper portion that is positioned between the pair of contact portions in the peripheral direction of the recliner; and a relative rotation range of the upper frame member relative to the lower frame member is restricted by contact between the stopper portion and the pair of contact portions.

4. A vehicle seat comprising:

a seat cushion on which an occupant sits;

a seatback that is provided at a rear end section of the seat cushion and that supports the back of the occupant; and the reclining device of claim 1, in which an inclination angle of the seatback is adjustable relative to the seat cushion.

5. The reclining device of claim 1, wherein:

a plurality of first fitting portions, in a row about a peripheral direction of the recliner, are formed at the lower frame member; and a plurality of second fitting portions, in a row about the peripheral direction of the recliner, are formed to the upper frame member, wherein the recliner includes:

a plurality of first projections welded to the lower frame member in a state fitted together with the plurality of first fitting portions; and a plurality of second projections welded to the upper frame member in a state fitted together with the plurality of second fitting portions.

* * * * *